Patented Feb. 23, 1943

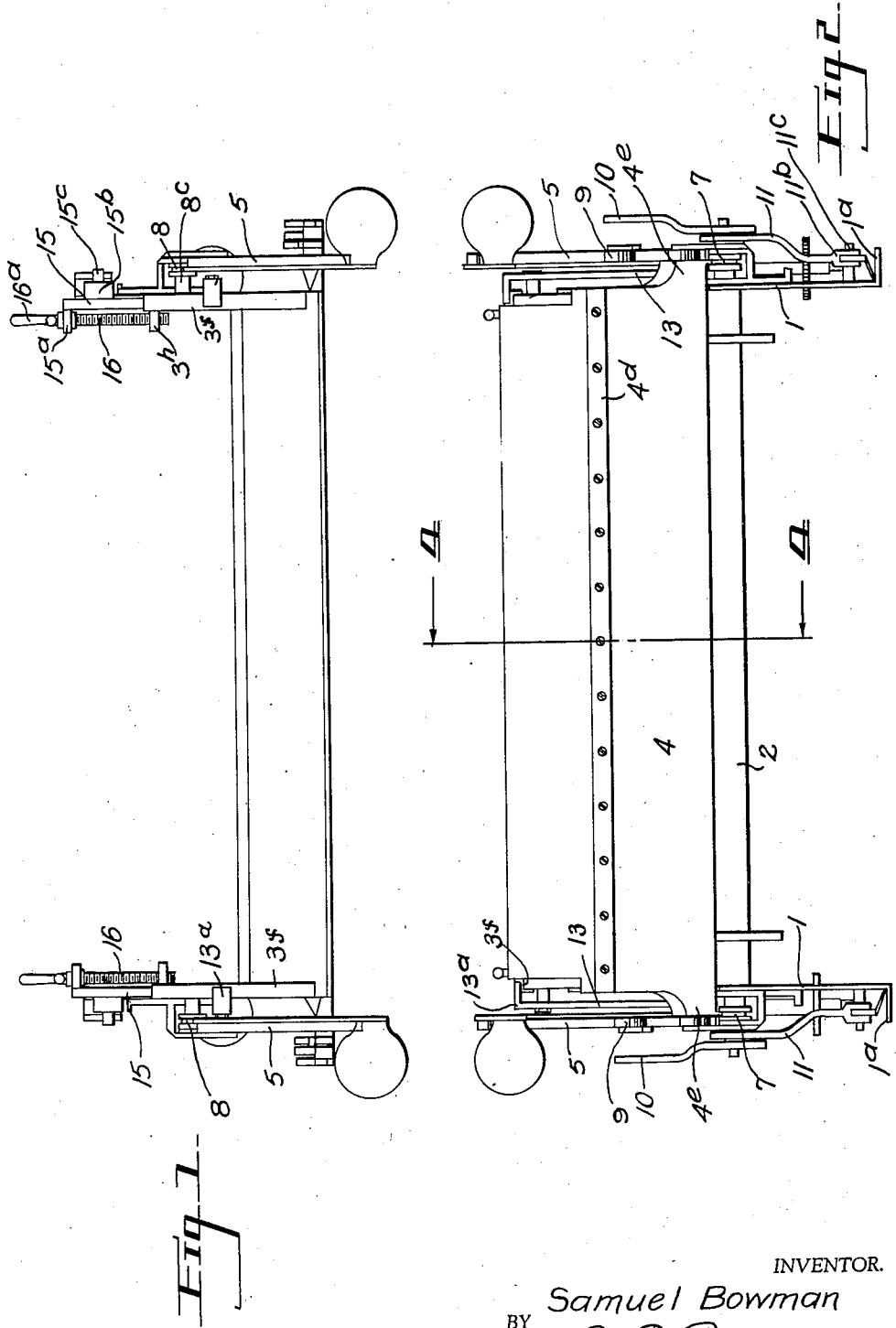

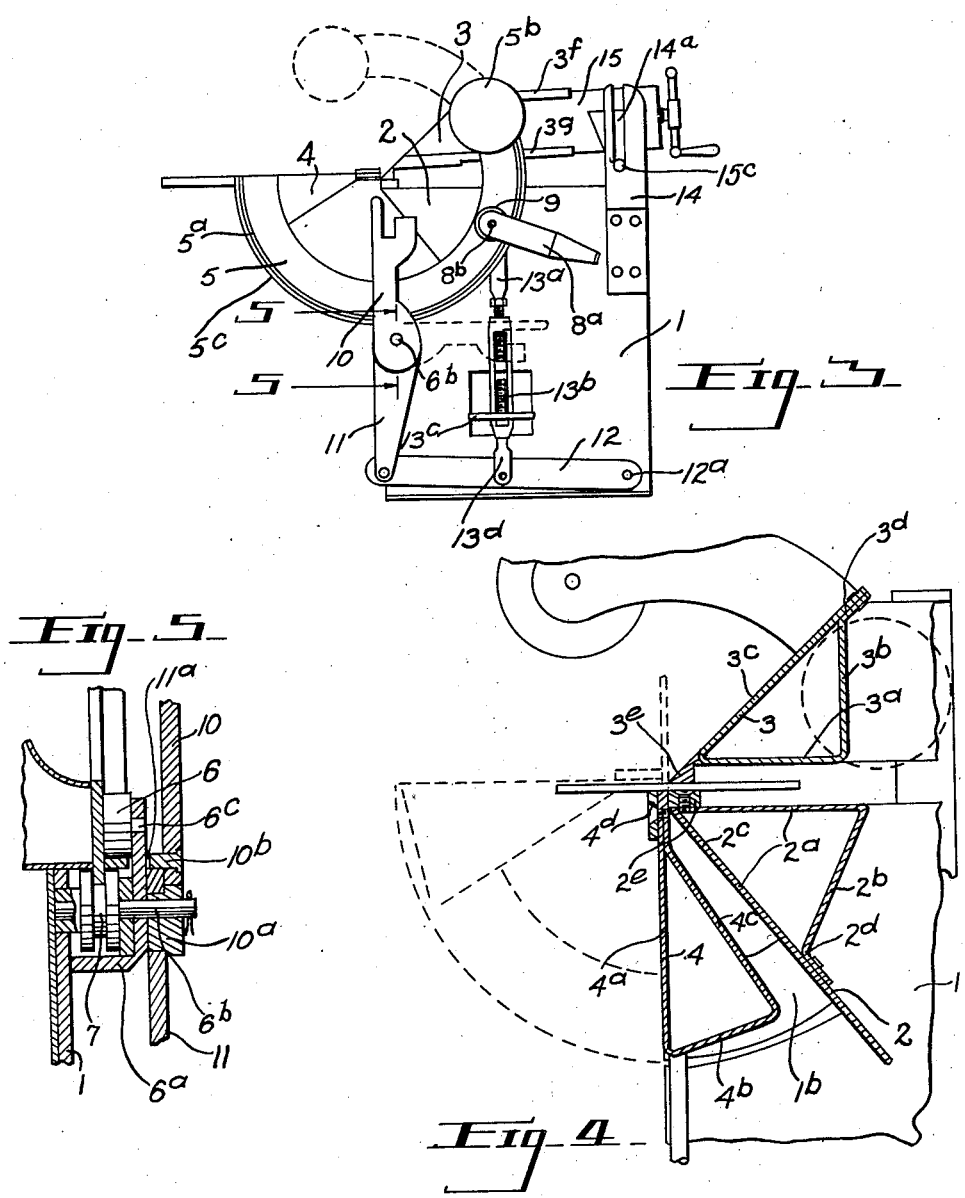

2,312,021

UNITED STATES PATENT OFFICE 2,312,021

SHEET METAL BRAKE

Samuel Bowman, East Los Angeles, Calif.

Application October 24, 1938, Serial No. 236,806

3 Claims. (Cl. 153—16)

My invention relates to a brake for bending sheet metal for various purposes and the objects of my invention are:

First, to provide a sheet metal brake that has a maximum depth of throat;

Second, to provide a brake of this class in which the material to be bent may be shifted lengthwise in either direction through the ends of the brake past the ends of the clamp member making it possible to brake metal longer than the machine;

Third, to provide a brake of this class in which large or circular pieces of metal can be bent from the outside to the center in varying degrees;

Fourth, to provide a brake of this class which is accessible from the front to the back which permits metal sheets with as much as a five inch flange to pass through the brake either up or down or both up and down, as desired.

Fifth, to provide a brake of this class which by reason of the ends being open permits the operator to see the position of the metal back of the faceplate;

Sixth, to provide a brake of this class in which the clamp members and braking member are constructed in triangular form which provides strength and eliminates weak points;

Seventh, to provide a brake of this class which provides for quick and ample adjustment of the shiftable clamp member forwardly and backwardly and upwardly and downwardly;

Eighth, to provide a brake of this class which is adjustable to take care of wear on the parts; and Ninth, to provide a brake of this class which is very simple and economical of construction, efficient in its action, easy to operate and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a top or plan view of my sheet metal brake; Fig. 2 is a front elevational view thereof with the clamp members in position for receiving the material, but clamped down together; Fig. 3 is an end elevational view of the machine and showing by dash lines varying positions of the clamp shift operating lever and the brake member supporting guides; Fig. 4 is a fragmentary enlarged sectional view taken from the line 4—4 of Fig. 2 and Fig. 5 is an enlarged sectional view taken from the line 5—5 of Fig. 3.

Similar characters of reference refer to similar parts and portions throughout the several views of the drawings:

The supporting brackets 1, rigid material clamp 2, shiftable material clamp 3, brake member 4, brake member supporting guides 5, brake supporting guides supporting rollers 6 to 9 inclusive, clamp shift operating levers 10, clamp shift links 11, clamp shift main levers 12, clamp and lever connections 13, clamp vertical guides 14, clamp adjustment guides 15, and clamp adjustment screws 16 constitute the principal parts and portions of my sheet metal brake.

The supporting brackets 1 are preferably wade of sheet plate and are positioned one at each end of the brake and are preferably made in integral relation with the rigid material clamp 2, the portion 2a of which is in alignment with the upper edge of the members 1 and extend across from one plate to the other, the portion 2b being sheared from the upper edge and bent down as shown best in Fig. 4 of the drawings. These plates 1 are turned outwardly at 1a to form bases for the supports 1 for the brake but have arcuate cutaway portions 1b shown best in Fig. 4 of the drawings for receiving the braking member 4 when it is positioned as shown in Fig. 4 of the drawings by solid lines. The member 2 is bent at the front edge of the portion 2a on an acute angle and extends backwardly and downwardly as shown by the portion 2c and the opposite ends of this portion 2c are rigidly secured to the end plates 1 by welding or otherwise. The lower ends of the members 2b and 2c are riveted together at 2d, shown best in Fig. 4 of the drawings, thus providing a triangular shaped rigid clamp member. This member 2 is provided on its front upper side with a plate which is preferably rectangular in cross section designated 2e on which the material to be bent is supported as shown in Fig. 4 of the drawings. The shiftable material clamp 3 is also preferably made of a single piece of sheet material in triangular form consisting of the horizontal portion 3a, vertical portion 3b, and inclined portion 3c and riveted together at the upper edge 3d, thus providing a hollow triangular shiftable clamp. It is provided on its front lower edge with a triangular extended material engaging portion 3e. This member 3 is provided at its opposite ends with backwardly extending grooved flanges 3f and 3g which extend backwardly some distance and face each other in spaced relation. In these grooved flanges 3f and 3g are shiftably mounted at each end of the brake the guide members 15. These guide members 15 are provided with lugs 15a in which is revolubly mounted the clamp adjusting screws 16 by means of a groove in the screw member 16 adjacent the handle 16a. These clamp screws 16 are screws threaded into lugs 3h extending from the extended portions 3i of the members 3, thus providing means for shifting the members 3 forwardly and backwardly by turning the handles 16a guided by the guide members 15 in the groove flanges 3f and 3g. Secured on the opposite sides of the members 15 from the screws 16 are brackets 15d which extend downwardly some distance and are provided with extending pins 15c near their lower ends. These pins 15c are mounted in slots 14a in bracket members 14 which extend upwardly from the supports 1 and are supported on said supports 1, thus providing guides for the members 15 vertically.

The brake member 4 is also hollow, triangular in shape consisting of the members 4a, 4b and 4c, preferably made of one piece of sheet material and extending the length of the brake. The edges of the members 4a and 4c are riveted together and on the one side of the member 4a is provided a reinforcing plate 4d which is removably connected thereto. It will be here noted that the extended ends of this member 4 extend past the ends of the plate 4d some distance as shown at 4e to provide the clearance past the ends of the clamping and braking surfaces of the brake, and secured to the extended ends of these portions 4e are the brake member supporting guides 5, one at each end, and rigidly secured to the member 4 with their outer edges extending past the outer extended side of the member 4. These brake member supporting guides 5 are arcuate in shape as shown best in Fig. 3 of the drawings and positioned on a radius from the point of contact between the front contacting sides of the members 2e and the upper edge of the member 4c. These brake member supporting guides are preferably made of flat plate and are provided on their outer sides with an outwardly extending concentric flange 5a, spaced slightly from the periphery of the main member 5. These brake member supporting guides 5 are provided on their extended ends with knobs 5b which serve as counterbalance weights and handles to be grasped by the hands of the operator for shifting the brake member 4, these brake member supporting guides 5 being the sole support and connection for the brake member. These brake member supporting guides 5 are supported in their proper relation for supporting the brake member 4 by means of rollers 6 and 9, which are flat-faced rollers adapted to engage the inner sides of the flanges 5a and by means of grooved rollers 7 and 8 which engage the extended portions 5c of the brake member supporting guides 5 and the outer sides of the flanges 5a, the rollers 6 and 7 being supported on brackets 6a secured on the outer side of the member 1 and provided with shafts 6b for supporting the rollers 7 and other shafts 6c for supporting the rollers 6, all shown best in Fig. 5 of the drawings. While the rollers 8 and 9 are supported by brackets 8a secured to the sides of the plates 1 and provided with shafts 8b for supporting the rollers 9 and shafts 8c for supporting the rollers 8, all as shown best in Figs. 1 and 3 of the drawings.

In order to provide means for raising and lowering the shiftable material clamp 3, there are provided clamp shift operating levers 10, one at each end which are bifurcated at their upper ends adapted to receive a pipe or other lever means for turning the same for tightening the clamp. These levers 10 are provided at their lower ends with eccentric bearing members 10a mounted on shafts 6b, and mounted on the bearing portions 10a are link members 11. These link members 11 are provided at their upper extended ends with stop lugs 11a which are adapted to engage pins 10b extending inwardly from the levers 10 to provide stops for the levers 10 when in vertical positions. These links 11 are bent inwardly at their lower ends and are provided with bifurcated ends 11b for connection by means of pins 11c with the main shift levers 12 at their one ends, it being noted that these pins 11b extend inwardly against the plates 1 to provide a guide and support in the movement of the links 11 and levers 12. These levers 12 are rotatably mounted at their opposite ends on the plates 1 by means of pins 12a. Connected intermediate the ends of these levers 12 are the opposite ends of the clamp lever connections 13 which consist of a strap member 13a mounted over the upper edge of the flange portion 3f secured to the end of the clamp member 3 and secured thereto and screw threaded adapted to receive the turn buckle members 13b which are provided with hand wheels 13c to facilitate the turning of the turn buckles, the plates 1 being provided with cutaway portions to receive the hand wheels 13c. The lower ends of the turn buckles 13b are connected with link members 13d which are connected intermediate the ends of the levers 12, all as shown best in Fig. 3 of the drawings.

The operation of my sheet metal brake is substantially as follows: The lever members 10 are turned downwardly to the dash line position shown in Fig. 3 of the drawings which raises the clamp member 3 which permits the placing of the material between the portions 3e and 2e of the rigid clamp member 2, as shown in Fig. 4 of the drawings with the brake member 4 down in the solid line position shown in Fig. 4 of the drawings. The material is placed to the position desired to be bent. Then by grasping the knobs 5b of the brake member supporting guides 5 and shifting them backwardly as indicated by the solid line position relatively to the dash line position in Fig. 3 of the drawings, the brake member is shifted upwardly to dash line position shown in Fig. 4 of the drawings and which may be carried upwardly to a right angle position with the portion 3c of the member 3, thus providing an acute angle bent in the material if desired.

Though I have shown and described a particular construction, combination and arrangement of parts and portions I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a sheet metal brake of the class described, the combination of a pair of clamp members each provided with metal engaging edges, a brake member provided with a metal engaging edge, arcuate supporting guide members secured to the extended ends of said brake member in spaced relation from its metal engaging edge, each of said arcuate supporting guide members provided with a laterally extending flange and with a flange extending outwardly therefrom in the plane with said supporting guide member, a pair of rollers in spaced relation from each other in engagement with the inner side of said laterally extending flange and a pair of grooved rollers in spaced relation with each other in engagement with the opposite side of said longitudinally extended flange and the said flange extending in a plane with said supporting guide, said rollers forming the sole support for said arcuate supporting guide member.

2. In a sheet metal brake of the class described, the combination of a pair of clamp members each provided with metal engaging edges, a brake member provided with a metal engaging edge, arcuate supporting guide members secured to the extended ends of said brake member in spaced relation from its metal engaging edge, each of said arcuate supporting guide members provided with a laterally extending flange and with a flange extending outwardly therefrom in the plane with said supporting guide member, a pair of rollers in spaced relation from each other in engagement with the inner side of said laterally extending flange, a pair of grooved rollers in spaced relation with each other in engagement with the opposite side of said longitudinally extended flange and the said flange extending in a plane with said supporting guide, said rollers forming the sole support for said arcuate supporting guide member, and means for adjusting the relative position of said rollers.

3. In a sheet metal brake of the class described, the combination of a pair of clamp members each provided with metal engaging edges, a brake member provided with a metal engaging edge, arcuate supporting guide members secured to the extended ends of said brake member in spaced relation from its metal engaging edge, each of said arcuate supporting guide members provided with a laterally extending flange and with a flange extending outwardly therefrom in the plane with said supporting guide member, a pair of rollers in spaced relation from each other in engagement with the inner side of said laterally extending flange, a pair of grooved rollers in spaced relation with each other in engagement with the opposite side of said longitudinally extended flange and the said flange extending in a plane with said supporting guide, said rollers forming the sole support for said arcuate supporting guide member, means for adjusting the relative position of said rollers, and means for adjusting the position of one of said clamp members relatively to the other.

SAMUEL BOWMAN.